Dec. 1, 1936.   P. B. JOHNSON   2,062,576
ROTARY INTERNAL COMBUSTION ENGINE
Filed Feb. 5, 1935   3 Sheets-Sheet 3
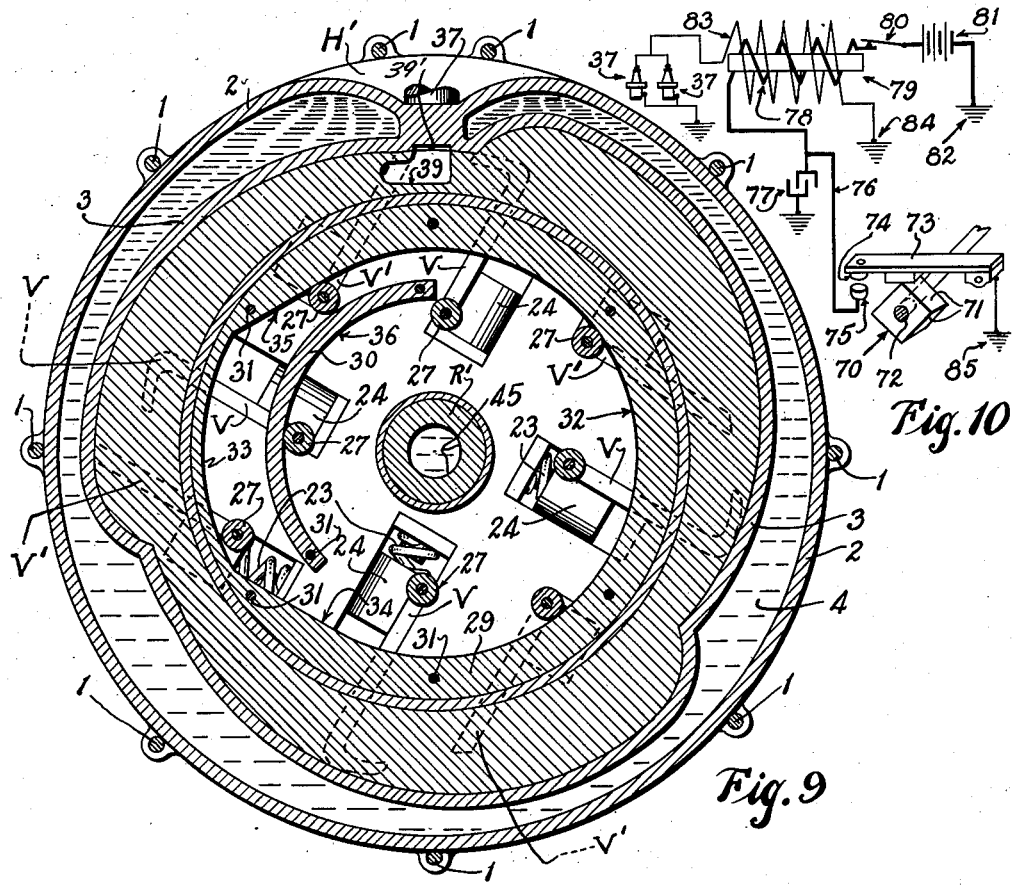
INVENTOR.
Paul B. Johnson
BY
ATTORNEY.

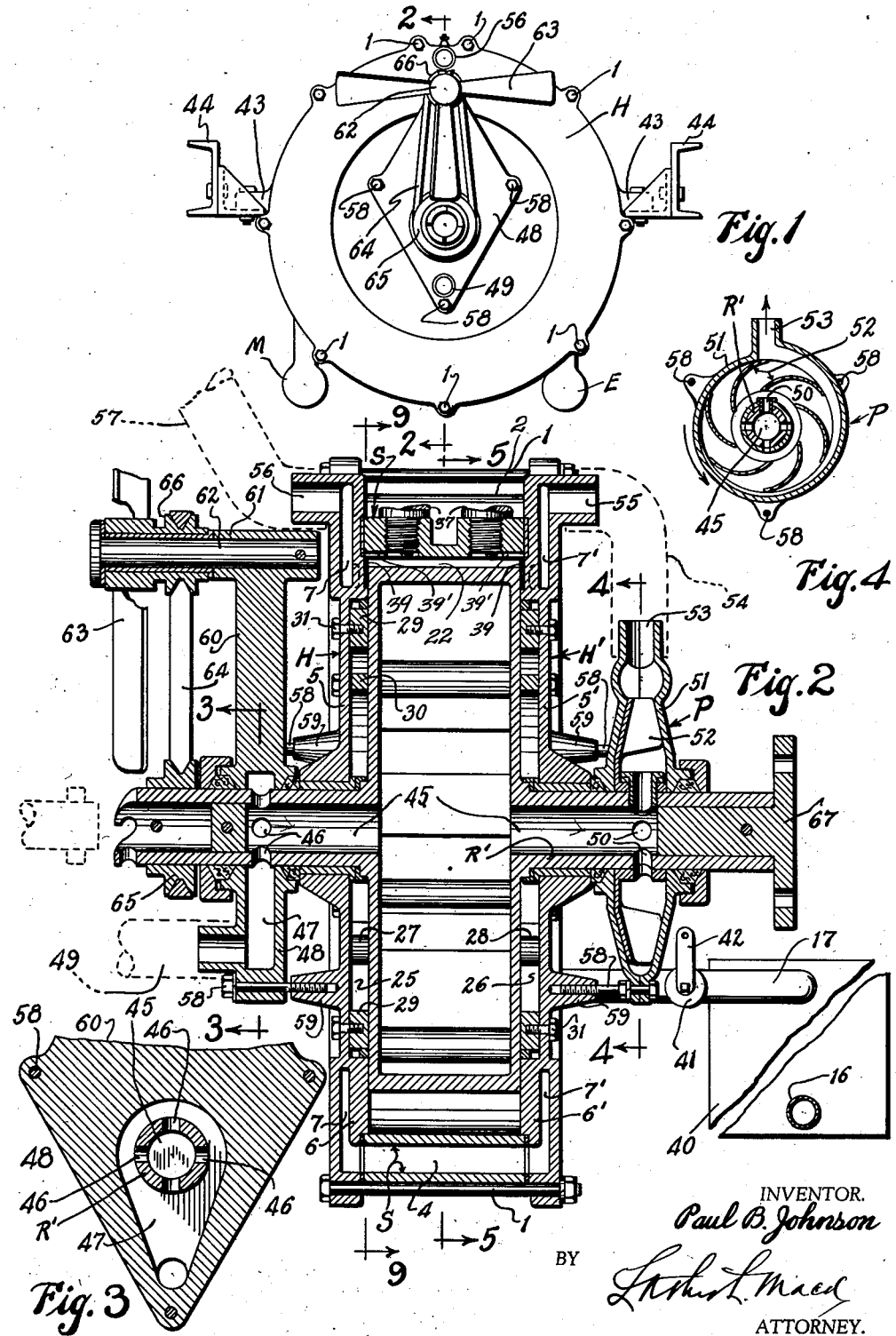

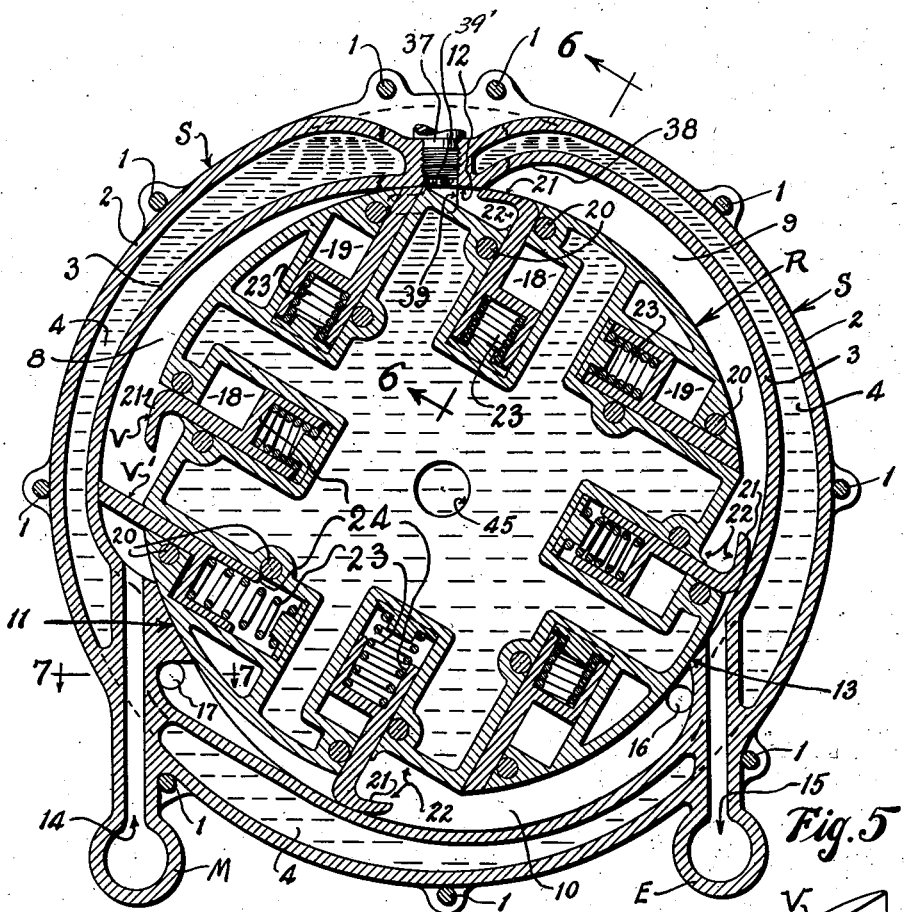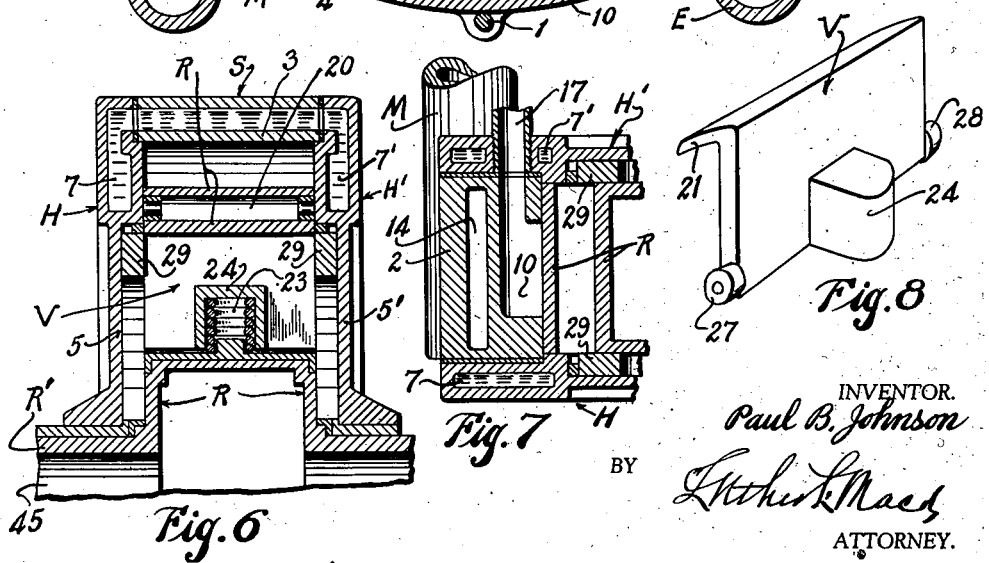

Patented Dec. 1, 1936

2,062,576

UNITED STATES PATENT OFFICE 2,062,576

ROTARY INTERNAL COMBUSTION ENGINE

Paul B. Johnson, Los Angeles, Calif., assignor of one-fourth to D. O. Anderson, one-fourth to Herbert Mayson, and one-fourth to P. E. Woods, all of Los Angeles, Calif.

Application February 5, 1935, Serial No. 5,077

14 Claims. (Cl. 123—16)

This invention relates to and has for a main object the provision of a satisfactory, economical, simple and durable rotary internal combustion engine, arranged for the continuous application of power to the rotor and further capable of arrangement in one or more units in which each unit may have one or more power impulses per revolution of the rotor, and wherein the intervals between the power impulses in a single unit or in a plurality of units are so timed as to provide a continuous impulse engine.

My invention is particularly characterized by the provision of a stator having circumferentially spaced compression and combustion chambers externally of the rotor periphery and a rotor having a compression pocket in its periphery, whereby, during the rotation of the rotor, the gas is compressed in the compression chamber of the stator and is transferred entirely to the pocket in the rotor prior to ignition, and by means of extensible vanes carried by the rotor and adapted to traverse the combustion chamber, upon ignition of the gas, the ensuing expansion acts upon said vanes to move the rotor forwardly in the stator for a given portion of a revolution.

The stator is formed with intermediate abutments between the compression and combustion chambers which have concentric portions closely contacting the periphery of the rotor, and the compression chamber is preferably of gradually decreasing cross sectional area from a maximum at the point of intake to a minimum at the point of complete compression. Thus, as a charge of gas is compressed it is gradually transferred to the pocket in the rotor in which it is carried over and beyond one of said abutments and is ignited prior to or at about the time said pocket is moved into communication with the combustion chamber.

The combustion chamber may also be of gradually decreasing area from the point of combustion to a point of exhaust, or at least the area thereof may be varied in such a manner that the maximum benefit of expansion may be provided. I may provide each rotor with one or a plurality of means for receiving power impulses from the expanding gas, in the form of extensible vanes arranged singly or in pairs at regularly spaced intervals around the periphery of the rotor and at least one of which is adjacent each of the pockets in said rotor. Also, cams may be provided for extending or retracting the vanes, or for actuating the vanes in opposite directions as may be most desirable.

A further object is to provide an additional chamber in the stator externally of the rotor periphery for containing a volume of oil useful as a lubricant and as a cooling medium for the vanes, or other fluid, whereby when the vanes of the rotor traverse said additional chamber, said vanes operate as pumps for causing the oil to flow continuously in a single direction, and thus serve to force the oil through a lubricating system for the engine or, when the flow of oil is controlled, to provide a brake for the engine.

Other objects include the provision of an adequate ignition system, a water cooling system and other necessary elements of a complete internal combustion motor for use in aeroplanes and motor cars and for stationary motors, as hereinafter described in detail.

I have shown in the accompanying drawings a preferred form of engine embodying my improvements and subject to modification, abridgment and additions, within the scope of the appended claims without departing from the spirit of my invention.

In said drawings:

Fig. 1 is a front end view, in elevation, of my improved engine;

Fig. 2 is a sectional elevation of the same on line 2—2 of Fig. 1;

Fig. 3 is a section of the same on line 3—3 of Fig. 2;

Fig. 4 is a section of the same on line 4—4 of Fig. 2;

Fig. 5 is a sectional elevation on line 5—5 of Fig. 2;

Fig. 6 is a fragmentary section on line 6—6 of Fig. 5;

Fig. 7 is a fragmentary section on line 7—7 of Fig. 5;

Fig. 8 is a perspective view of one of the vanes associated with the rotor;

Fig. 9 is a sectional elevation on line 9—9 of Fig. 2;

Fig. 10 is a diagram of the ignition circuit.

In its simplest form, embodying but a single power unit, as shown in Fig. 2, my engine structure includes a stator S of annular form and having detachable end heads H and H', all of which members are held together in leak-proof relationship by means of a plurality of bolts 1, 1 etc. Stator S may have a circular outer wall 2 and a profiled inner wall 3 which is spaced from said outer wall so as to provide a water chamber 4. The heads H and H' have central webs 5 and 5', respectively, and inner annular portions 6 and 6' offset from the outer walls to provide water chambers 7 and 7' which are in communication with the chamber 4 of the stator S.

In its preferred form the stator S has three circumferentially spaced chambers 8, 9 and 10 which are externally of a rotor R, and three abutments 11, 12 and 13 which separate the chambers 8, 9 and 10 and the inner faces of which closely fit the periphery of rotor R. Chamber 8 constitutes a compression chamber and has a gas inlet 14 adjacent the abutment 11 and near its lower end, while chamber 9 has an outlet 15 adjacent abutment 13 and constitutes an expansion and combustion chamber. Chamber 10 constitutes an oil sump and has an inlet 16 and an outlet 17 at opposite extremities thereof which are adapted to be connected so that oil as a lubricant may be caused to circulate through said chamber during the rotation of rotor R.

It will be observed that the compression chamber 8 is of maximum depth and area at a point slightly above the inlet 14 and that the depth and area thereof gradually decreases in the direction of and attains a minimum at a point where the inner side of the chamber wall merges with the concentric surface of abutment 12, as shown in Fig. 5, while the lower portion of the chamber wall rather abruptly extends from the concentric face of abutment 11 to its junction with wall 3. The upper end of chamber 9 is more or less abrupt from the face of abutment 12 to the inner side of wall 3 and the depth and area of said chamber gradually decreases in the direction of exhaust outlet 15. The depth and area of oil chamber 10 may be more or less uniform, although in the drawings I have shown it as decreasing in a clockwise direction similar to chambers 9 and 10, thus causing the vanes V to be retracted so as to pass abutment 11 and also permitting the release of the vanes from the pressure against the oil as the vanes approach abutment 11.

Rotor R is of hollow form and is adapted to receive water as a cooling medium when it is circulated by means of a pump P through stator S, rotor R and rotor shaft R'. As shown in the drawings, the rotor R is provided with means for receiving four power impulses for each revolution thereof and said means includes four uniformly spaced sets of spaced vanes V and V' which are extensibly mounted on the rotor in planes which are tangent to a common circle concentric with the axis of shaft R'.

Vanes V and V' are slidably held in recesses 18 and 19, respectively, between roller bearings 20, 20 etc. so arranged as to reduce the friction on the vanes to a minimum, and the vanes V differ from the vanes V' only in the provision on the vanes V of flanges 21 which are turned in a direction opposite to the direction of rotation of rotor R. Said flanges overlie pockets 22, 22', etc. formed in the periphery of rotor R and of a capacity sufficient to hold, when closed by abutment 12, a complete charge of gas under compression. For instance, if the compression ratio of the engine is six to one, the capacity of the pockets 22 will be one sixth of the total capacity of the compression chamber 8 when the vanes V and V' are positioned at the top substantially as shown in Fig. 5.

Springs 23, 23, etc. are provided for the vanes V and V' and are nested in recessed lugs 24, 24, etc. formed on the sides of the vanes near their bottoms, as shown in Figs. 5, 6 and 8. Obviously, said springs are compressible in the recesses 18 and 19 when the vanes are retracted and expand for forcing the vanes outwardly so that the outer ends of the vanes will traverse the inner walls of the chambers 8, 9 and 10 and the concentric faces of the abutments 11, 12 and 13.

Heads H and H' are recessed at 25 and 26, respectively, for the reception of rollers 27 and 28, which are carried by the vanes V and V' in transverse alinement at points near the lower edges of the vanes and are adapted to be successively engaged by cams 29 or 30 disposed within the recesses 25 and 26, in pairs, and attached to the heads H and H' by means of screws or bolts 31, 31, etc. As shown in Fig. 9, cam 29 has an elongated concentric dwell 32, a shorter concentric dwell 33 of greater radius than the dwell 32 and intermediate portions 34 and 35 which connect opposite extremities of dwells 32 and 33. Cam 30 is of arcuate form and has an internal dwell 36 concentric with shaft R'. Dwells 33 may be dispensed with as the vanes V' engage the wall 3 of the compression chamber.

The dwells 32 of cams 29 serve to hold the vanes V' in retracted positions during predetermined intervals in each revolution of rotor R while the dwells 33 of said cams permit the extension of said vanes during other predetermined intervals in each revolution of rotor R. The inner sides of cams 30 also engage the rollers 27 and 28 of vanes V and serve to hold said vanes retracted during the compression cycles of operation. As shown in Fig. 9, in broken lines, during the combustion cycle, the vanes V' are retracted by the dwells 32 of the cams 29 while the vanes V are retracted only by the contour of the wall 3 of the chambers 9 and 10 so that said vanes V will be free to traverse the wall throughout the length of said chambers.

As shown in Figs. 5 and 9, the direction of rotation of rotor R is clockwise so that as vanes V', in succession, pass the inlet 14 their springs 23 operate to extend the vanes into frictional engagement with the inner contoured surface of wall 3 while the vanes V which are retracted by the abutment 12 are successively engaged by the inner arcuate dwells of cams 30 and are held in retracted positions throughout the traverse of the chamber 8. Thus, successive charges of gas from a carburetor C are drawn through a pipe or manifold M and inlet 14 into chamber 8 by the vanes V', V', etc. while at the same times said vanes V' operate to compress previous charges of gas in chamber 8 between the vanes V' and the abutment 12. The pockets 22 of the rotor are in communication with chamber 8 during the compression cycles and until said pockets are moved into positions adjacent the concentric faces of abutment 12, the length of which faces may vary in accordance with necessity and depending upon the lag in combustion. In any event it will be noted that the compressed charges of gas for ignition are carried in the pockets 22 and is ignited by one or more spark plugs 37 which are held at a selected point on the stator, and immediately or soon after ignition the pockets 22 move into communication with combustion chamber 9. The initial expansion, under combustion, quickens the extension of vanes V by creating pressure against the flanges 21 of said vanes and causes said flanges to traverse the inclined end 38 of abutment 12 and constant expansion against the vanes V forces said vanes forwardly in chamber 9 and also serves to exhaust the products of combustion from a previously ignited charge through outlet 15. Vanes V' when once retracted by the eccentric portion of wall 3 adjacent abutment 12, and possibly assisted by portions 35 of cams 29 are held retracted by dwells 32 of cams 29 throughout the combustion, exhaust and oil pumping cycles of operation.

It is well known that when internal combustion engines attain high speeds, compensating provision by some spark advancing means must be provided for what is known as combustion lag, and I provide such a means in my engine. For instance, as shown in Fig. 5, the spark plug 37 may ignite the compressed gas in pockets 22 at slow or medium speeds by direct communication of said plugs with said pockets at the periphery of rotor R.

But, if the peripheral speed of rotor R is increased beyond a medium rate, ignition must take place substantially in advance of the position shown in Fig. 5 in order to compensate for the combustion lag before the pockets 22 reach the expansion chamber 9. To this end I provide shallow recesses 39, 39, on opposite sides of rotor R in the walls of stator S and adjacent the abutment 12. Said recesses 39, 39, are extended to the left, as seen in Fig. 9, from and communicate with other shallow recesses 39', 39', formed in the abutment 12 and each of recesses 39' is in communication with one of the spark plugs 37.

As shown in Fig. 2, the open ends of pockets 22 communicate with the recesses 39 in such a manner that gas is forced under pressure into the recesses 39 and thence through recesses 39' to the spark plugs 37 substantially in advance of the position shown in Fig. 5. Thus, if the advanced spark occurs at said substantially advanced position of pockets 22 the lag in combustion will be compensated for by reason of the fact that the pockets 22 may travel a substantial distance from the point of ignition without moving the main portion of the gas in pockets 22 out of communication with the lateral recesses 39, due to the elongation of both the pockets 22 and recesses 39. Hence, combustion is assured before expansion occurs in chamber 9.

Oil for lubricating purposes may be supplied from a sealed tank 40 to which the inlet 16 and outlet 17 are connected, and said tank is preferably mounted at an elevation above the chamber 10 so that said chamber will be filled at all times. Thus, the oil is circulated through the chamber 10 and tank 40 continuously during the operation of the engine. In the event it may be desired to use the oil pump for the purpose of braking the engine, a valve 41 may be provided either in the inlet or outlet pipe 16 or 17 and arranged for operation by means of a lever 42 to which suitable operating means may be connected. Obviously, when valve 41 is open the oil will flow freely and if the flow of oil is retarded or stopped by closing said valve partially or completely the operation of the engine will be correspondingly affected.

Stator S may be provided with outwardly projecting feet 43, 43 at the sides thereof for attachment to the side members 44, 44 of an automobile frame whereby the engine may be supported on a chassis, as in other types of motors. Shaft R' of rotor R is preferably hollow so that a passage 45 is provided therein through which water may be fed to and from the interior of the rotor for cooling purposes. When arranged as shown in Fig. 2, inlets 46 are provided in the shaft for providing communication between the passage 45 and an inlet chamber 47 formed in a member 48 and to which a pipe 49 (shown in dotted lines) is connected and may lead to the bottom of a radiator (not shown).

The rear end of shaft R' is also provided with ports 50 forming outlets which lead to the interior of pump P, said pump having a casing 51 and an impeller 52 rotatable therein and an outlet 53 adapted to be connected by a pipe 54 (shown in dotted lines) with an inlet 55 at the top of head H'. Head H has an outlet 56 adapted for connection with a pipe 57 (shown in dotted lines) leading to the top of a radiator. Thus, water is circulated through shaft R', rotor R, thence through pump P, chamber 7' of head H', chamber 4 of stator S, chamber 7 of head H, outlet 56 and the pipe 57 to the radiator from which it is again drawn by pump P into the inlet chamber 47.

Pump P and member 48 are similarly secured to stator S by means of bolts 58, 58 above and below the shaft R' and secured to bosses 59, 59, projecting outwardly from heads H and H', as shown in Fig. 2. Said member 48 has an upwardly extended arm 60 with a bearing 61 at its top in which a shaft 62 is journalled and a fan 63 is secured to the outer end of said shaft. Fan 63 is operated by means of a belt 64 driven by a pulley 65 on shaft R' and operating over a pulley 66 attached to said fan. Shaft R' may be suitably connected to an extension or to a driven member by means of a flange 67 attached to the rear end thereof, as shown in Fig. 2.

Fig. 10 shows a diagram of an ignition circuit for a single unit engine embodying a circuit breaker including a rotatable cam 70 having a number of facets 71 corresponding to the number of pairs of vanes V and V' carried by rotor R. Cam 70 is held on a shaft 72 which is adapted to be suitably connected with and is to rotate at the same speed as shaft R'. A breaker 73 of usual form is operated by cam 70 and has a contact 74 which alternately engages and disengages a contact 75. A wire 76 leads from contact 74 through a condenser 77 to ground and also to a primary winding 78 of a spark coil 79 which is connected with a switch 80. Said switch is connected with a battery 81 which is grounded at 82. The secondary winding 83 of coil 79 is connected in parallel with spark plugs 37, 37 and is grounded at its other extremity at 84. Breaker 73 is grounded at 85.

Thus, as rotor R revolves the circuit of the primary coil 78 is broken by the disengagement of contacts 74 and 75 as each set of vanes V and V' and the associated pocket 22 reaches a predetermined point on stator S, thereby setting up an induced high tension current in the secondary coil 83 which causes the plugs 37 to spark, for igniting the fuel in the pockets 22.

In operation, as the rotor revolves on its axis the compressing vanes V' move in succession by the inlet 14 and induce successive charges of gas from the carburetor into the compression chamber 8 and at the same time during the intake cycle of operation said vanes compress the previously induced charges of fuel in said chamber. The impulse vanes V precede the vanes V' and remain in retracted positions during the compression cycles and are free to extend into engagement with the stator wall only after they have passed the abutment 12, at which times the pockets 22 associated with said impulse vanes have received the compressed charges of fuel. Ignition occurs at a point far enough in advance of chamber 9 for effecting combustion of the fuel before vanes V begin their traverse of the inclined portion 38 of abutment 12, so that the full force of the expanding gas will be exerted on the body and flanges 21 of said vanes, for forcing said vanes outwardly and forwardly at the same time, due to the inclination of the abutment.

At or about the time each of the vanes V receives a power impulse the vane V' of a following set begins another intake and/or compression cycle and a preceding vane V will have completed a power stroke and at the same time the complete exhaust of a preceding charge of fuel. The length and area of chamber 9 are determined so as to prolong the expansion cycle to a maximum extent and by gradually decreasing the area thereof in the direction of the exhaust outlet 15 greater efficiency is obtained.

Lubrication of the moving parts is effected by the movement of the vanes V and V' through the oil chamber 10, as it is obvious that a sufficient quantity of lubricant may be carried from chamber 10 to chambers 8 and 9 by said vanes as to thoroughly lubricate the walls of the stator and the portions of the rotor which form supports for the sliding vanes.

Thus, as the energy created by combustion of the fuel in one of the pockets 22 is minimized the fuel in a succeeding pocket is ignited and when a sufficient number of pairs of vanes V and V' are embodied in the rotor R there is continuous application of power to the rotor.

What I claim is:

1. A rotary internal combustion motor comprising: a stator formed with a sealed rotor compartment provided with a plurality of circumferentially spaced concentric abutments and intermediate circumferential chambers, one of said chambers forming a compression chamber and another chamber forming a combustion and expansion chamber, said compression chamber having a fuel inlet, said combustion chamber having an exhaust outlet, and a rotor in said compartment provided with a plurality of extensible vanes and a plurality of peripheral pockets associated with said vanes in which fuel is compressed, said vanes being adapted to traverse the surfaces of said compression and combustion chambers for successively inducing and compressing charges of fuel into said pockets and for expanding said fuel during combustion, certain of said vanes having portions overlying and extensible relative to said pockets whereby the expansion of fuel in the pockets will urge said vanes to extended positions, and means for igniting said fuel at predetermined points in the rotation of said rotor.

2. A rotary internal combustion motor comprising: a stator having a plurality of alternating circumferentially spaced abutments and chambers, a rotor housed within said stator and cooperating with said abutments to close said chambers against communication with each other, a plurality of peripherally extensible vanes carried by said rotor for traversing the surfaces of said chambers and said abutments, said rotor having peripheral pockets between pairs of said vanes open to communication with said chambers for receiving compressed charges of fuel in one of said chambers and transferring the same to an adjacent chamber for combustion and expansion, said vanes having portions overlying said pockets, means adjacent one of said abutments for igniting the charges of fuel, and means for supplying fuel to and for exhausting the products of combustion from said stator.

3. A rotary internal combustion motor comprising: a stator having circumferentially spaced compression and combustion chambers and an abutment separating said chambers, said compression chamber having a fuel inlet, said combustion chamber having an exhaust outlet, a rotor housed in said stator internally of said chambers and rotatably engaging said abutment, a plurality of peripherally extensible vanes carried by said rotor and adapted to traverse the surfaces of said chambers for successively inducing charges of fuel into and compressing the same in said compression chamber, pockets being formed in said rotor adjacent said vanes for receiving the compressed charges of fuel and for transferring the same to said combustion chamber for combustion and expansion, certain of said vanes having portions retractible into and adapted to overlie said pockets, and means for igniting the charges of fuel at predetermined points in the rotation of said rotor for directing the force of the expanding charges of fuel during combustion against said vanes during their traverse of said combustion chamber, for effecting the rotation of the rotor.

4. A rotary internal combustion motor comprising: a stator having circumferentially spaced compression and combustion chambers and an abutment separating said chambers, said compression chamber having a fuel inlet, said combustion chamber having an exhaust outlet, a rotor housed in said stator internally of said chambers and rotatably engaging said abutment, a plurality of peripherally extensible vanes carried by said rotor and adapted to traverse the surfaces of said chambers for successively inducing charges of fuel into and compressing the same in said compression chamber, pockets being formed in said rotor between pairs of said vanes for receiving the compressed charges of fuel and for transferring the same to said combustion chamber for combustion and expansion, one of the vanes adjacent each pocket having a portion overlying said pocket and means for igniting the charges of fuel at predetermined points in the rotation of said rotor for directing the force of the expanding charges of fuel during combustion to said vanes during their traverse of said combustion chamber, for effecting the rotation of the rotor, recesses being provided in said stator in constant communication with said ignition means and intermittently communicating with the fuel pockets in said rotor whereby said ignition means will be in communication with the pockets for sustained intervals after the pockets have been moved past the ignition point.

5. A rotary internal combustion motor comprising: a stator having circumferentially spaced compression and combustion chambers and an abutment separating said chambers, said compression chamber having a fuel inlet, said combustion chamber having an exhaust outlet, a rotor housed in said stator internally of said chambers and rotatably engaging said abutment, a plurality of peripherally extensible vanes carried by said rotor and adapted to traverse the surfaces of said chambers for successively inducing charges of fuel into and compressing the same in said compression chamber, pockets being formed in said rotor between pairs of said vanes for receiving the compressed charges of fuel and for transferring the same to said combustion chamber for combustion and expansion, and means for igniting the charges of fuel at predetermined points in the rotation of said rotor for directing the force of the expanding charges of fuel during combustion against said vanes during their traverse of said combustion chamber, for effecting the rotation of the rotor, one of the pair of vanes adjacent each of said pockets having a portion overlying the fuel in the pockets whereby during combustion of the fuel the pressure of the expanding fuel will be exerted outwardly as well as forwardly on said vanes.

6. A rotary internal combustion motor comprising: a stator having a rotor compartment therein formed with circumferentially spaced compression, combustion and oil chambers and concentric abutments intermediate said chambers, a fuel inlet for said compression chamber, an exhaust outlet for said combustion chamber, a rotor in said stator having a plurality of concentric peripheral portions and intermediate pockets open to said chambers, a plurality of impulse vanes carried by and peripherally extensible from said rotor at points adjacent the forward extremities of said pockets and having portions overlying said pockets and adapted to traverse the surfaces of said combustion and oil chambers, a plurality of compressing vanes peripherally extensible on said rotor at the rear extremities of said pockets and adapted to traverse the surface of said compression chamber, said compressing vanes being adapted to induce charges of fuel into and to compress previously induced charges of fuel in said compression chamber, whereby the compressed charges of fuel are transferred to the pockets of said rotor, successively, as the pockets are moved in the direction of the forward extremity of the compression chamber for transfer of the compressed fuel to said combustion chamber, and means for igniting the charges of fuel as said pockets are advanced toward the combustion chamber, whereby the expansion of the fuel will be exerted on said impulse vanes for imparting motion to the rotor.

7. A rotary internal combustion motor comprising: a stator having a rotor compartment therein formed with circumferentially spaced compression, combustion and oil chambers and concentric abutments intermediate said chambers, a fuel inlet for said compression chamber, an exhaust outlet for said combustion chamber, a rotor in said stator having a plurality of concentric peripheral portions and intermediate pockets open to said chambers, a plurality of impulse vanes carried by and peripherally extensible from said rotor at points adjacent the forward extremities of said pockets and having portions overlying said pockets and adapted to traverse the surfaces of said combustion and oil chambers, a plurality of compressing vanes peripherally extensible on said rotor at the rear extremities of said pockets and adapted to traverse the surface of said compression chamber, said compressing vanes being adapted to induce charges of fuel into and to compress previously induced charges of fuel in said compression chamber, whereby the compressed charges of fuel are transferred to the pockets of said rotor, successively, as the pockets are moved in the direction of the forward extremity of the compression chamber for transfer of the compressed fuel to said combustion chamber, means for igniting the charges of fuel as said pockets are advanced toward the combustion chamber, whereby the expansion of the fuel will be exerted on said impulse vanes for imparting motion to the rotor, and means for extending and retracting said vanes at predetermined points and for predetermined periods of time during the rotation of said rotor.

8. A rotary internal combustion motor comprising a stator having a rotor compartment therein formed with circumferentially spaced compression, combustion and oil chambers and concentric abutments intermediate said chambers, a fuel inlet for said compression chamber, an exhaust outlet for said combustion chamber, a rotor in said stator having a plurality of concentric peripheral portions and intermediate pockets open to said chambers, a plurality of impulse vanes carried by and peripherally extensible from said rotor at points adjacent the forward extremities of said pockets and having portions adapted to traverse the surfaces of said combustion and oil chambers, a plurality of compressing vanes peripherally extensible on said rotor at the rear extremities of said pockets and adapted to traverse the surface of said compression chamber, said compressing vanes being adapted to induce charges of fuel into and to compress previously induced charges of fuel in said compression chamber, whereby the compressed charges of fuel are transferred to the pockets of said rotor, successively, as the pockets are moved in the direction of the forward extremity of the compression chamber for transfer of the compressed fuel to said combustion chamber, means for igniting the charges of fuel as said pockets are advanced toward the combustion chamber, whereby the expansion of the fuel will be exerted on said impulse vanes for imparting motion to the rotor, and lateral recesses formed in said stator at opposite points intermediate said compression and combustion chambers for affording prolonged communication between said ignition means and the fuel in said pockets for overcoming lag in combustion when the R. P. M. of the rotor are increased beyond a certain rate.

9. A rotary internal combustion motor comprising: a stator having a rotor compartment therein formed with circumferentially spaced compression, combustion and oil chambers and concentric abutments intermediate said chambers, a fuel inlet for said compression chamber, an exhaust outlet for said combustion chamber, a rotor in said stator having a plurality of concentric peripheral portions and intermediate pockets open to said chambers, a plurality of impulse vanes carried by and peripherally extensible from said rotor at points adjacent the forward extremities of said pockets and having portions adapted to traverse the surfaces of said combustion and oil chambers, a plurality of compressing vanes peripherally extensible on said rotor at the rear extremities of said pockets and adapted to traverse the surface of said compression chamber, said compressing vanes being adapted to induce charges of fuel into and to compress previously induced charges of fuel in said compression chamber, whereby the compressed charges of fuel are transferred to the pockets of said rotor, successively, as the pockets are moved in the direction of the forward extremity of the compression chamber for transfer of the compressed fuel to said combustion chamber, means for igniting the charges of fuel as said pockets are advanced toward the combustion chamber, whereby the expansion of the fuel will be exerted on said impulse vanes for imparting motion to the rotor, said impulse vanes having rearwardly extended portions overlying said pockets and forming outer walls for said pockets when the vanes are retracted whereby the expansion of the ignited fuel will be exerted on said extended portions for urging the vanes outwardly into contact with the wall of the combustion chamber.

10. A rotary internal combustion motor comprising: a stator having a rotor compartment formed with circumferentially spaced compression, combustion and oil chambers and concentric abutments intermediate said chambers, said compression chamber having a fuel inlet, said combustion chamber having an exhaust outlet, a rotor housed in said stator and rotatably engaging said abutments, said rotor having a plurality of circumferentially spaced pockets on the periphery thereof open to said chambers, an impulse vane and a compression vane peripherally extensible on said rotor adjacent the opposite extremities of each of said pockets, respectively, said compression vanes being adapted to traverse and engage the outer wall of said compression chamber, for inducing charges of fuel into and for compressing the same in said compression chamber and in said pockets, said impulse vanes being adapted to traverse and engage the outer walls of said combustion and oil chambers when power impulses are imparted thereto by the expanding fuel during combustion and to operate as impellers for circulating oil through said oil chamber, said impulse vanes having outer extensions overlying said pockets, for the purpose described.

11. A rotary internal combustion motor comprising: a stator having a rotor compartment formed with circumferentially spaced compression, combustion and oil chambers and concentric abutments intermediate said chambers, said compression chamber having a fuel inlet, said combustion chamber having an exhaust outlet, a rotor housed in said stator and rotatably engaging said abutments, said rotor having a plurality of circumferentially spaced pockets on the periphery thereof open to said chambers, an impulse vane and a compression vane peripherally extensible on said rotor adjacent the opposite extremities of said pockets, respectively, said compression vanes being adapted to traverse and engage the outer wall of said compression chamber, for inducing charges of fuel into and for compressing the same in said compression chamber and in said pockets, said impulse vanes being adapted to traverse and engage the outer walls of said combustion and oil chambers when power impulses are imparted thereto by the expanding fuel during combustion and to operate as impellers for circulating oil through said oil chamber, and means for extending and retracting said vanes to and from operative positions during predetermined cycles of operation, said impulse vanes having outer extensions overlying said pockets, for the purpose described.

12. A rotary internal combustion motor comprising: a stator having a rotor compartment formed with circumferentially spaced compression, combustion and oil chambers and concentric abutments intermediate said chambers, said compression chamber having a fuel inlet, said combustion chamber having an exhaust outlet, a rotor housed in said stator and rotatably engaging said abutments, said rotor having a plurality of circumferentially spaced pockets on the periphery thereof open to said chambers, an impulse vane and a compression vane peripherally extensible on said rotor adjacent the opposite extremities of each of said pockets, said compression vane being adapted to traverse and engage the outer wall of said compression chamber, for inducing charges of fuel into and for compressing the same in said compression chamber and in said pockets, said impulse vanes being adapted to traverse and engage the outer walls of said combustion and oil chambers when power impulses are imparted thereto by the expanding fuel during combustion and to operate as impellers for circulating oil through said oil chamber, means for extending said vanes to operative positions at predeterminated points in each revolution thereof, and independent means for retracting said vanes and for holding the same retracted during predetermined cycles of operation, said impulse vanes having outer extensions overlying said pockets, for the purpose described.

13. A rotary internal combustion motor comprising a stator having a rotor compartment formed with circumferentially spaced compression and combustion chambers and an abutment therebetween, said compression chamber having a fuel inlet, said combustion chamber having an exhaust outlet, a rotor in said compartment having a peripheral pocket therein open to said chambers, an impulse vane peripherally extensible on said rotor adjacent one extremity of and having an arcuate portion overlying said pocket, a compression vane peripherally extensible on said rotor adjacent the other extremity of said pocket, means for retracting said impulse vane during a compression cycle and for extending the same during a power cycle of operation, whereby charges of fuel compressed in said pocket while within said compression chamber may be transferred by the movement of said rotor to said combustion chamber, and means for igniting the compressed charges of fuel in said pocket, for applying power impulses to said impulse vanes.

14. A rotary internal combustion motor comprising: a stator having a rotor compartment formed with circumferentially spaced compression and combustion chambers and an abutment therebetween, said compression chamber having a fuel inlet, said combustion chamber having an exhaust outlet, a rotor in said compartment having a peripheral pocket therein open to said chambers, an impulse vane peripherally extensible on said rotor adjacent one extremity of and having a portion overlying said pocket, a compression vane peripherally extensible on said rotor adjacent the other extremity of said pocket, means for retracting said impulse vane during a compression cycle and for extending the same during a power cycle of operation, whereby charges of fuel compressed in said pocket while within said compression chamber may be transferred by the movement of said rotor to said combustion chamber, means for igniting the compressed charges of fuel in said pocket, for applying power impulses to said impulse vanes, and means for retracting said compression vane during a power cycle and for extending the same during a compression cycle of operation.

PAUL B. JOHNSON.